United States Patent
Seyanagi

(10) Patent No.: US 9,283,649 B2
(45) Date of Patent: Mar. 15, 2016

(54) TANK AND METHOD FOR PRODUCING POLISHING PAD USING TANK

(75) Inventor: Hiroshi Seyanagi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 14/111,120

(22) PCT Filed: Apr. 25, 2011

(86) PCT No.: PCT/JP2011/060046
§ 371 (c)(1),
(2), (4) Date: Oct. 10, 2013

(87) PCT Pub. No.: WO2012/147147
PCT Pub. Date: Jan. 11, 2012

(65) Prior Publication Data
US 2014/0038493 A1    Feb. 6, 2014

(51) Int. Cl.
*B24B 37/24* (2012.01)
*B29C 39/24* (2006.01)
(Continued)

(52) U.S. Cl.
CPC ............ *B24B 37/24* (2013.01); *B24B 37/042* (2013.01); *B29C 39/006* (2013.01); *B29C 39/24* (2013.01);
(Continued)

(58) Field of Classification Search
CPC ...... B24B 37/042; B24B 37/30; B24B 37/04; B24B 37/26; B24B 37/24; C08J 2375/04; C08G 2101/0083; B29C 33/60; B29C 33/62; B65D 7/04
USPC ......... 451/41, 526–539; 220/4.08, 4.04, 4.16, 220/4.17, 4.22, 4.24, 23.83, 23.86, 23.87; 264/331.19; 51/296; 521/130, 133, 521/110–112, 170–174
See application file for complete search history.

(56) References Cited

U.S. PATENT DOCUMENTS 58,648 A *  10/1866  Joy .............................. 220/4.17
436,543 A *  9/1890  Quigley ....................... 220/500
(Continued)

FOREIGN PATENT DOCUMENTS

| JP | H05-277908 A | 10/1993 |
|----|---|---|
| JP | 3455187 B2 | 10/2003 |
| JP | 2008137355 A | 6/2008 |

OTHER PUBLICATIONS

Notification of Examination Opinions with Search Report issued by Taiwan Intellectual Property Office, mailed Feb. 25, 2014, for Taiwan counterpart application No. 10320254810.

(Continued)

*Primary Examiner* — George Nguyen
(74) *Attorney, Agent, or Firm* — Law Office of Katsuhiro Arai

(57) ABSTRACT

It is an object of the invention to provide a tank for use in making high-quality, air void-less, polishing pads, to provide a method for producing a polishing pad using the tank, and to provide a polishing pad obtained by such a production method. A tank for holding a resin composition, the tank comprising two or more body components and joint parts, wherein the two or more body components are joined by the joint parts to form a frame-shaped body, at least one of the joint parts includes an opening and closing member that joins adjacent ones of the body components in such a way that the adjacent body components can swing open, and at least another one of the joint parts includes a joint member that joins adjacent ones of the body components in such a way that the adjacent body components can swing about the joint member.

5 Claims, 6 Drawing Sheets

(51) Int. Cl.
*B65D 8/00* (2006.01)
*B24B 37/04* (2012.01)
*B65D 25/04* (2006.01)
*B29C 39/00* (2006.01)
*B29C 44/38* (2006.01)
*B29L 31/00* (2006.01)
*B29K 75/00* (2006.01)

(52) U.S. Cl.
CPC . *B29C 44/38* (2013.01); *B65D 7/04* (2013.01); *B65D 25/04* (2013.01); *B29K 2075/00* (2013.01); *B29L 2031/736* (2013.01)

(56) References Cited

U.S. PATENT DOCUMENTS

| | | | | |
|---|---|---|---|---|
| 902,846 A * | 11/1908 | Smith | ............ | B65D 90/08 220/4.04 |
| 931,600 A * | 8/1909 | Hafely | ............ | 220/500 |
| 1,169,022 A * | 1/1916 | Eldridge | ............ | B65D 7/12 109/79 |
| 1,276,814 A * | 8/1918 | Roades | ............ | 220/4.17 |
| 1,430,798 A * | 10/1922 | Crites | ............ | 220/4.12 |
| 1,460,999 A * | 7/1923 | Cooper | ............ | 137/205 |
| 1,494,818 A * | 5/1924 | Shean | ............ | 220/4.17 |
| 1,972,807 A * | 9/1934 | Waters | ............ | E04H 7/065 220/4.17 |
| 2,656,969 A * | 10/1953 | Kvasnok | ............ | A01G 9/026 229/198.3 |
| 2,690,274 A * | 9/1954 | Thurston | ............ | B65D 7/04 220/264 |
| 2,798,784 A * | 7/1957 | Marshall | ............ | A47J 47/14 220/4.22 |
| 2,833,087 A * | 5/1958 | Wedding | ............ | B65D 7/04 220/4.28 |
| 3,117,693 A * | 1/1964 | Vogel | ............ | B05D 7/16 206/456 |
| 4,561,705 A * | 12/1985 | Schafer | ............ | B25H 3/023 220/4.22 |
| 5,054,635 A * | 10/1991 | Kolom | ............ | H01L 31/073 220/4.15 |
| 5,514,245 A | 5/1996 | Doan et al. | | |
| 6,026,999 A * | 2/2000 | Wakefield | ............ | B60R 11/06 220/4.22 |
| 6,117,295 A * | 9/2000 | Bjerke et al. | ............ | 204/515 |
| 6,732,880 B1 * | 5/2004 | Nash, Sr. | ............ | B65F 1/02 220/4.22 |
| 6,843,242 B2 * | 1/2005 | Marocco | ............ | 125/1 |
| 6,902,061 B1 * | 6/2005 | Elstone | ............ | B65D 19/02 206/596 |
| 7,966,786 B2 * | 6/2011 | Koteskey | ............ | E02D 29/12 220/4.04 |
| 8,181,806 B2 * | 5/2012 | Hidalgo Vargas | .. | B65D 11/1833 220/4.08 |
| 8,558,149 B2 * | 10/2013 | Huber | ............ | A47J 36/027 206/45.23 |
| 2005/0222288 A1 | 10/2005 | Seyanagi et al. | | |
| 2006/0283852 A1 * | 12/2006 | Greiner | ............ | B65F 1/068 220/4.22 |
| 2007/0194019 A1 * | 8/2007 | Seagle | ............ | B65D 19/18 220/4.08 |
| 2012/0228305 A1 * | 9/2012 | Peng | ............ | 220/500 |
| 2014/0038493 A1 * | 2/2014 | Seyanagi | ............ | 451/41 |

OTHER PUBLICATIONS

Notification of Reasons for Refusal issued by the Japanese Patent Office, mailed Oct. 1, 2013, for Japanese counterpart application No. 2010-068221.
International Search Report (ISR) mailed May 31, 2011, issued for international application No. PCT/JP2011/060046.
An Office Action issued by the Korean Intellectual Property Office, mailed Jun. 27, 2014, for Korean related application No. 10-2013-7021854.
An Office Action issued by the Chinese Intellectual Property Office, mailed Feb. 2, 2015, with a Search Report (Jan. 21, 2015) for Chinese related application No. 2011800700728.
Notification of Transmittal of Translation of the International Preliminary Report on Patentability (PCT/IB/338) mailed Nov. 7, 2013, with International Preliminary Report on Patentability (PCT/IB/373) and Written Opinion of the International Searching Authority (PCT/ISA/237), for corresponding international application PCT/JP2012/060046.

* cited by examiner

TANK AND METHOD FOR PRODUCING POLISHING PAD USING TANK

TECHNICAL FIELD

The invention relates to a tank for holding a resin composition and particularly to a tank for use in making polishing pads from a resin composition having high viscosity or high thizotropy. Also, the invention relates to method for producing a polishing pad capable of performing planarization of materials requiring a high surface planarity such as optical materials including a lens and a reflecting mirror, a silicon wafer, a glass substrate or an aluminum substrates for a hard disc and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND ART

Typical materials requiring surface flatness at high level include a single-crystal silicon disk called a silicon wafer for producing semiconductor integrated circuits (IC, LSI). The surface of the silicon wafer should be flattened highly accurately in a process of producing IC. LSI etc., in order to provide reliable semiconductor connections for various coatings used in manufacturing the circuits. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

The polishing pad used is preferably made of a polyurethane foam. For example, the following methods are proposed to produce such a polyurethane foam.

There is proposed a method including providing a mold under the bottom of a tank, injecting a polyurethane foam-forming composition into the mold from the tank through a valve provided at the bottom of the tank, and performing reaction and curing of the injected polyurethane foam-forming composition to form a polyurethane foam (Patent Document 1).

Unfortunately, the method of Patent Document 1 has a problem in that when the polyurethane foam-forming composition has high viscosity or high thixotropy, the composition is difficult to be well discharged through the valve, and thus the composition can cause clogging, or a raw material or a cured product can adhere to the inside of the valve and then enter the composition, so that the quality of the product can degrade or air voids can easily form during the process of injecting the composition into the mold through the valve.

There is also proposed a method of producing a molded resin product, which includes a first step of adding, to a tank, a liquid raw material for use in forming a molded resin product; and a second step of pouring the liquid raw material from the tank into a mold and curing it, wherein the first step is performed while the opening formed at the side of the tank is closed with a door member, and the second step includes opening the door member to open the opening so that the liquid raw material for use in forming the molded resin product is poured into the mold placed below the opening (Patent Document 2).

However, the method of Patent Document 2 also has a problem in that when the liquid raw material for use in forming a molded resin product has high viscosity or high thixotropy, air voids can easily form during the process of pouring the liquid raw material into the mold. There is also a problem in that the raw material can adhere to the inner wall of the door member and then often drip onto the liquid surface, which can often degrade the product quality of a molded resin product.

PRIOR ART DOCUMENTS

Patent Documents

Patent Document 1: Japanese Patent No. 3455187
Patent Document 2: JP-A-2008-137355

SUMMARY OF THE INVENTION

Problems to be Solved by the Invention

It is an object of the invention to provide a tank for use in making high-quality, air void-less, polishing pads, to provide a method for producing a polishing pad using the tank, and to provide a polishing pad obtained by such a production method. It is another object of the invention to provide a method for manufacturing a semiconductor device using such a polishing pad.

Means for Solving the Problems

As a result of earnest studies to solve the problems, the inventors have accomplished the invention based on findings that the objects can be achieved by the tank and the production method described below.

Thus, the present invention is directed to a tank for holding a resin composition, the tank comprising two or more body components and joint parts, wherein the two or more body components are joined by the joint parts to form a frame-shaped body, at least one of the joint parts includes an opening and closing member that joins adjacent ones of the body components in such a way that the adjacent body components can swing open, and at least another one of the joint parts includes a joint member that joins adjacent ones of the body components in such a way that the adjacent body components can swing about the joint member.

A common tank has a joint-less, single body. On the other hand, the tank of the invention includes two or more body components that are joined by joint parts to form a frame-shaped body. In addition, at least one of the joint parts includes an opening and closing member that joins adjacent ones of the body components in such a way that the adjacent body components can swing open, and at least another one of the joint parts includes a joint member that joins adjacent ones of the body components in such a way that the adjacent body components can swing about the joint member. According to this feature, the adjacent body components can be allowed to swing open when the opening and closing member is opened. Thus, when the tank is placed in a casting mold, a resin composition held in the tank can be cast into the casting mold through the side of the tank.

In a preferred embodiment of the invention, three body components are joined by joint parts to form a cylindrical body, one of the joint parts includes an opening and closing member that joins adjacent ones of the body components in such a way that the adjacent body components can swing open, and the other two joint parts each include a joint member that joins adjacent ones of the body components in such a way that the adjacent body components can swing about the joint member. When the tank is in the form of a cylinder, raw resin materials can be uniformly stirred and mixed in the tank, so that a resin composition can be prepared as a uniform mixture. To make the structure of the tank simple, the number of the body components and the number of the joint parts are preferably as small as possible. However, if the tank is composed of two body components that are joined by joint parts to form a cylindrical body, it can be difficult to fix the tank in a casting mold when the adjacent body components are allowed to swing open by opening the opening and closing member, so that the producing process can be complicated. On the other hand, if the tank is composed of three body components that are joined by joint parts to form a cylindrical body, one body component can be fixed in a casting mold when the other adjacent body components are allowed to swing open by opening the opening and closing member, which is advantageous for the producing process.

Also, the invention relates to a method for producing a polishing pad, the method comprising a process of making a polishing layer made of polyurethane resin, the process including the steps:

(A) holding a polyurethane resin composition in the tank according to claim 1 placed in a casting mold;

(B) opening the opening and closing member on the tank to allow adjacent ones of the body components to swing open, so that the polyurethane resin composition is cast from the tank into the casting mold; and (C) curing the cast polyurethane resin composition to form a polyurethane resin.

Even if the polyurethane resin composition is highly viscous or highly thixotropic, the production method makes it possible, with a simple operation, to cast the polyurethane resin composition from the tank into the casting mold without forming air voids. The production method is also advantageous in that the raw material adhering to the inner wall of the tank is less likely to enter the polyurethane resin composition in the casting mold. This makes it possible to produce high-quality polishing pads.

The step (A) may include stirring a first component in the tank in the presence of a nonreactive gas, wherein the first component contains an isocyanate group-containing compound and a silicone surfactant, so that the nonreactive gas is dispersed as fine bubbles to form a bubble dispersion liquid; and mixing a second component with the formed bubble dispersion liquid to form the polyurethane resin composition to be held in the tank, wherein the second component contains an active hydrogen group-containing compound. This method makes it possible to make a polishing pad of a polyurethane foam containing fine cells without using hollow beads or the like.

Moreover, the invention relates to a method for manufacturing a semiconductor device, comprising a step of polishing a surface of a semiconductor wafer using the aforementioned polishing pad.

BRIEF DESCRIPTION OF THE DRAWINGS

FIG. 6b is a schematic cross-sectional view along the line A-A' in FIG. 6a;

FIG. 7b is a schematic cross-sectional view along the line A-A' in FIG. 7a;

FIG. 8b is a schematic cross-sectional view along the line A-A' in FIG. 8a.

MODE FOR CARRYING OUT THE INVENTION

Figure 1A:
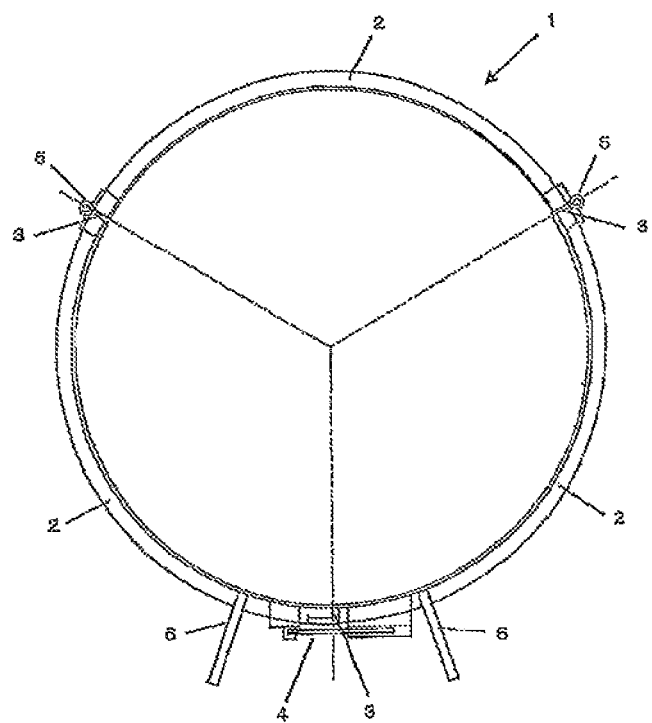
FIG. 1a is a plan view schematically showing the structure of a tank.
Figure 1B:
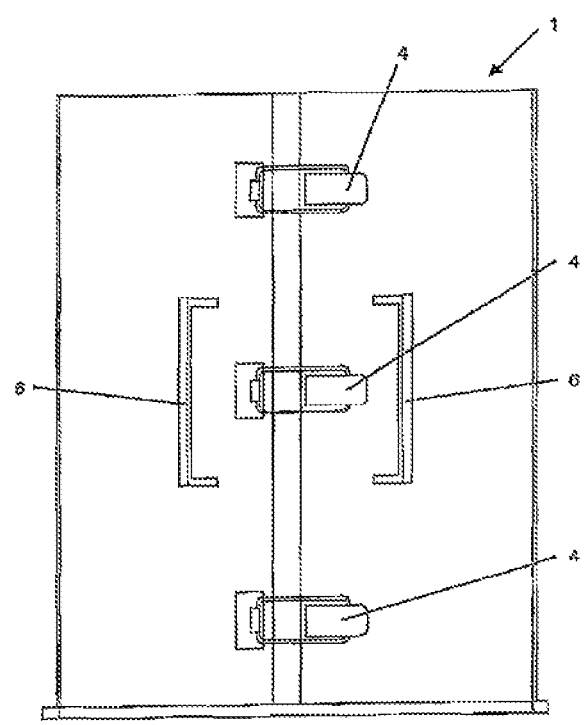
FIG. 1b is a front view schematically showing the structure of the tank.

Embodiments of the invention will be described with reference to the drawings. FIG. 1a is a plan view schematically showing the structure of a tank according to the invention. FIG. 1b is a front view schematically showing the structure of the tank according to the invention. A tank 1 includes two or more body components 2 and joint parts 3, in which the body components 2 are joined by the joint parts 3 to form a frame-shaped body. At least one of the joint parts 3 includes opening and closing members 4 that join the adjacent body components 2 in such a way that the adjacent body components 2 can swing open. At least another one of the joint parts 3 includes a joint member 5 that joins the adjacent body components 2 in such a way that the adjacent body components 2 can swing about the joint member 5. The tank 1 shown in FIG. 1a has three body components 2 that are joined by joint parts 3 to form a cylindrical body. The tank 1 is preferably cylindrical tube-shaped, but may be triangle tube-shaped, quadrangular tube-shaped, or polygonal tube-shaped. When the tank 1 is cylindrical tube-shaped, it preferably includes three body components 2, and in particular, it preferably includes three body components 2 having the same arc length. The tank 1 is preferably bottomless, but may be formed with a bottom. The opening and closing members 4 are provided to reliably keep the closed state. The body components 2 on which the opening and closing members 4 are provided may each have a handle part 6 for making the opening and closing of the body components 2 easy.

Figure 2A:
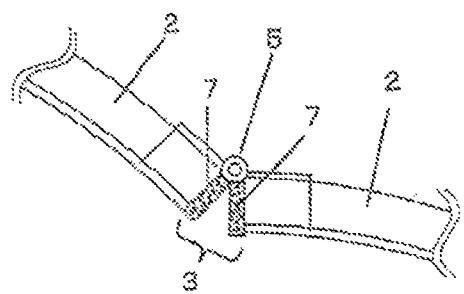
FIG. 2a is a schematic view showing the structure of a joint part of the tank when the joint part is opened.
Figure 2B:
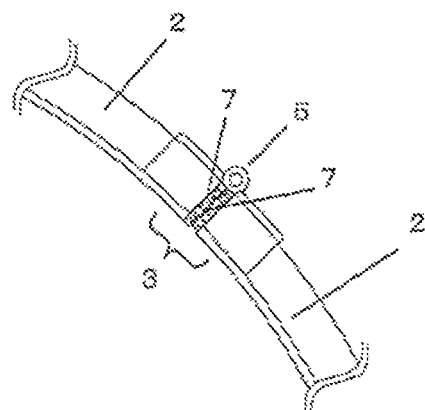
FIG. 2b is a schematic view showing the structure of a joint part of the tank when the joint part is closed.
Figure 3A:
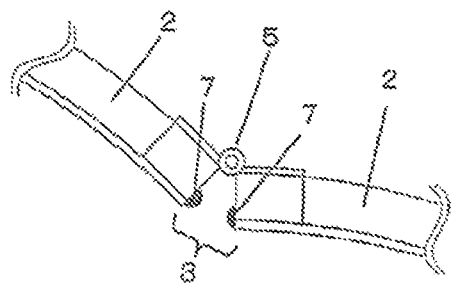
FIG. 3a is a schematic view showing the structure of a joint part of the tank when the joint part is opened.
Figure 3B:
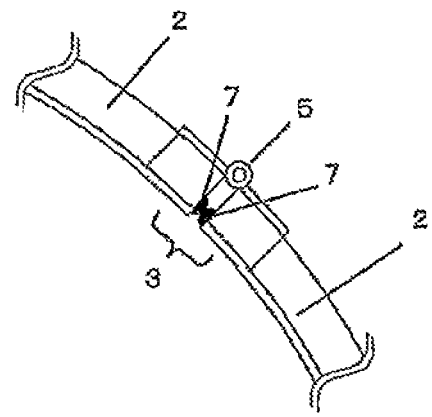
FIG. 3b is a schematic view showing the structure of a joint part of the tank when the joint part is closed.

FIGS. 2a and 3a are schematic views showing the structure of the joint part of the tank according to the invention when the joint part is opened. FIGS. 2b and 3b are schematic views showing the structure of the joint part of the tank according to the invention when the joint part is closed. The joint part 3 has the joint member 5, such as a hinge, which joins the adjacent body components 2 in such a way that they can swing about the joint member 5. The joint part 3 also has seal members 7, such as foamed or non-foamed materials, for preventing fluid leakage. The joint part 3 preferably has a structure capable of providing face sealing or line (point) sealing based on elastic deformation of the seal members 7.

The inner diameter of the tank 1 is preferably several times the outer diameter of a mixer blade. The height of the tank 1 is preferably such that a resin composition does not overflow when stirred with a mixer. The volume of the tank 1 is generally, but not limited to, about 2 to about 90 liters.

The tank of the invention may be equipped with a mixer for preparing a resin composition.

Next, a description will be given of how to make a polishing pad made of a cured resin using the tank.

Figure 4A:
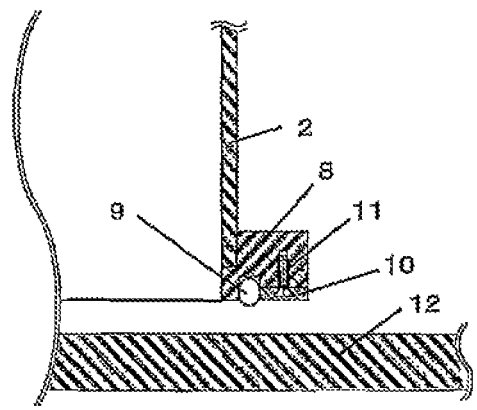
FIG. 4a is a schematic cross-sectional view showing a state before a bottomless tank is placed in a casting mold.
Figure 4B:
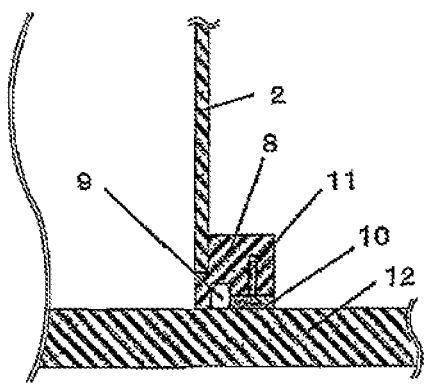
FIG. 4b is a schematic cross-sectional view showing a state after the bottomless tank is placed in the casting mold.
Figure 5A:
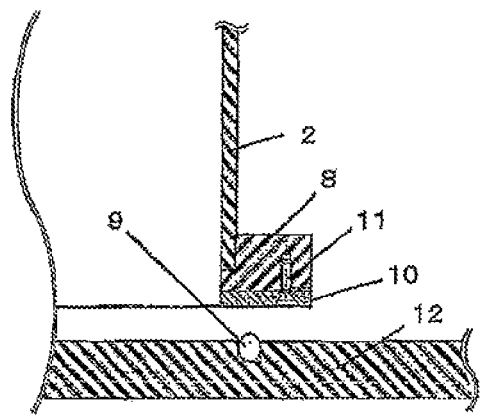
FIG. 5a is a schematic cross-sectional view showing a state before a bottomless tank is placed in a casting mold.
Figure 5B:
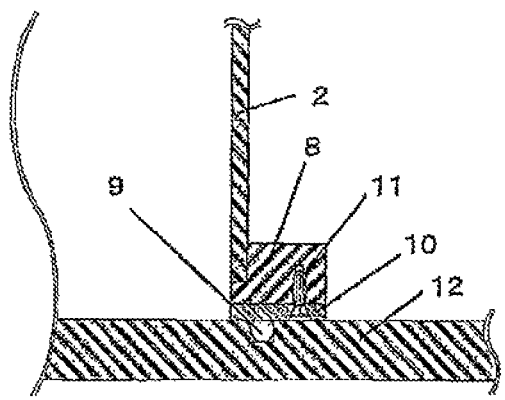
FIG. 5b is a schematic cross-sectional view showing a state after the bottomless tank is placed in the casting mold.

First, the tank is placed in a casting mold. When the tank is formed with a bottom, a resin composition may be added to the tank, and then the tank may be placed in a casting mold. FIGS. 4a and 5a are schematic cross-sectional views showing the state before the bottomless tank is placed in the casting mold. FIGS. 4b and 5b are schematic cross-sectional views showing the state after the bottomless tank is placed in the casting mold.

The circumference surface of an end part of the tank is preferably provided with an assisting member 8 for making easy the placement of the tank on the surface of a casting mold 12. The assisting member 8 preferably has a seal member 9, such as a foamed or non-foamed material, for preventing fluid leakage from the end part. When the assisting member 8 is not provided, the seal member 9 may be directly provided on the end part of the tank. On the other hand, as shown in FIG. 5a, the seal member 9 may also be provided on the surface of the casting mold 12. As shown in FIGS. 4b and 5b, when the tank is placed in the casting mold, the seal member 9 provides face sealing or line (point) sealing by being deformed elastically.

In addition, the assisting member 8 on each of the two body components 2 capable of swinging open preferably has a frictional resistance reducing member 10, such as a fluororesin sheet, for reducing the frictional resistance between the end face of the body component and the surface of the casting mold when the body components are opened or closed.

Subsequently, a resin composition is added to the tank placed in the casting mold. The resin composition may be prepared in the tank by adding each raw material to the tank and mixing the materials with stirring, or the resin composition may be prepared in advance and then added to the tank.

Examples of the resin used to form the polishing pad (polishing layer) include, but are not limited to, polyurethane resin, polyester resin, polyamide resin, acrylic resin, polycarbonate resin, halide resin (e.g., polyvinyl chloride, polytetrafluoroethylene, polyvinylidene fluoride, etc), polystyrene, olefin resin (e.g., polyethylene, polypropylene, etc.), epoxy resin, photosensitive resin, and any blend thereof. Polyurethane resin is a particularly preferred material for forming polishing pads because it has good wear resistance and polymers having the desired physical properties can be easily obtained by changing the composition of raw materials in various ways. Hereinafter, a case where polyurethane resin is used to form a polishing pad (polishing layer) will be described.

The polyurethane resin contains an isocyanate component, a polyol component (high-molecular-weight polyol, low-molecular-weight polyol, etc.) and a chain extender.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

As the high-molecular-weight polyol, examples thereof include polyether polyols represented by polytetramethylene ether glycol; polyester polyols represented by polybutylene adipate; polyester polycarbonate polyols exemplified by reaction products of polyester glycol such as polycaprolactone polyol or polycaprolactone and alkylene carbonate; polyester polycarbonate polyols obtained by reacting ethylene carbonate with polyvalent alcohol and the reacting the resultant reaction mixture with an organic dicarboxylic acid; and polycarbonate polyols obtained by ester exchange reaction between polyhydroxyl compound and aryl carbonate. These may be used singly or in combination of two or more kinds.

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. Still other examples that can be used together with the high-molecular-weight polyol also include: alcoholamines such as monoethanolamine, 2-(2-aminoethylamino)ethanol, monopropanolamine and the like. These low-molecular-weight polyols, low-molecular-weight polyamines etc. may be used alone or as a mixture of two or more thereof.

In a case where a polyurethane resin is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline)(MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'- tetraisopropyldiphenylmethane, 1,2-bis(2-aminophenylthio) ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; a low-moleculer-weight polyol; and a low-molecular-weight polyamine. The chain extenders described above may be used either alone or in mixture of two kinds or more.

A ratio between an isocyanate component, a polyol component and a chain extender can be altered in various ways according to molecular weights thereof, desired physical properties of a polishing pad and the like.

Manufacture of a polyurethane resin is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent.

Manufacture of the polyurethane resin is to mix the first component containing an isocyanate group-containing compound and the second component containing an active hydrogen group-containing compound to thereby cure the reaction product. In the prepolymer method, an isocyanate-terminated prepolymer serves as an isocyanate group-containing compound and a chain extender serves as an active hydrogen group-containing compound. In the one shot method, an isocyanate component serves as an isocyanate group-containing compound, and a chain extender and a polyol component combined serves as an active hydrogen group-containing compound.

Foamed or non-foamed polyurethane resin may be used. Foamed polyurethane resin is preferred in view of the polishing performance of polishing pads.

Manufacturing methods of a polyurethane foam include: a method in which hollow beads are added, a mechanically foaming method, a chemically foaming method and the like.

A mechanical foaming method with the aid of a silicone surfactant made of a copolymer of polyalkylsiloxane and polyether is particularly preferred. Preferred examples of such a silicone surfactant include SH-192 and L-5340 (manufactured by Dow Corning Toray Silicone Co., Ltd), and B8465 (manufactured by Goldschmidt).

Various additives may be mixed; such as a catalyst promoting polyurethane reaction, such as tertiary amine-based catalysts, a stabilizer including an antioxidant, a lubricant, a pigment, a filler, an antistatic agent and others.

Hereinafter, a method for producing a polishing pad made of a polyurethane foam will be described.

First, in the tank, a first component containing an isocyanate group-containing compound and a silicone surfactant is stirred in the presence of a nonreactive gas, so that the nonreactive gas is dispersed as fine bubbles and thus a bubble dispersion liquid is obtained. A second component containing an active hydrogen group-containing compound is then added to the prepared bubble dispersion liquid and mixed with stirring to form a foamed polyurethane resin composition.

The nonreactive gas used for forming fine bubbles is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the first component to form fine bubbles with the nonreactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine bubbles.

In a preferable mode, different stirrers are used in stirring for forming the bubble dispersion liquid and in stirring for mixing an added second component, respectively. In particular, stirring for mixing an added second component may not be stirring for forming cells, and a stirrer not generating large cells is preferably used. Such a stirrer is preferably a planetary mixer. The same stirrer may be used in the stirring step and the mixing step, and stirring conditions such as revolution rate of the stirring blade are preferably regulated as necessary.

The opening and closing members provided on the tank are then opened, and the adjacent body components are allowed to swing open, so that the polyurethane resin composition is cast from the tank into the casting mold.

Figure 6A:
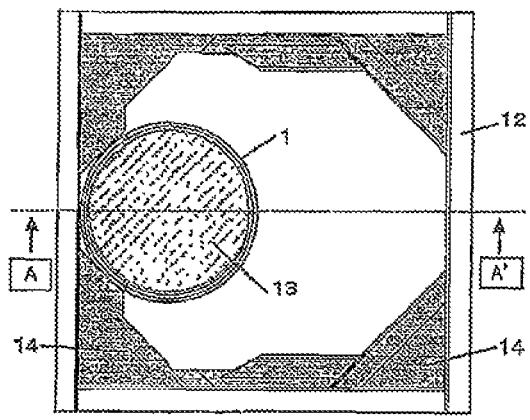
FIG. 6a is a schematic plan view showing a state in which a tank containing a polyurethane resin composition is placed in a casting mold.
Figure 6B:
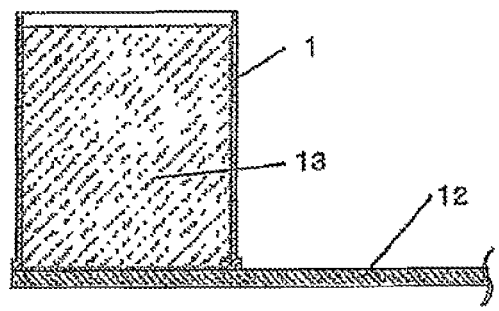

FIG. 6a is a schematic plan view showing a state in which the tank containing the polyurethane resin composition is placed in the casting mold. FIG. 6b is a schematic cross-sectional view along the line A-A' in FIG. 6a. The tank 1 has three body components that are joined by joint parts to form a cylindrical body. A frame member 14 for fixing the tank 1 at a certain position and allowing a polyurethane resin composition 13 to be cast in a specific shape is preferably placed in the casting mold 12.

Figure 7A:
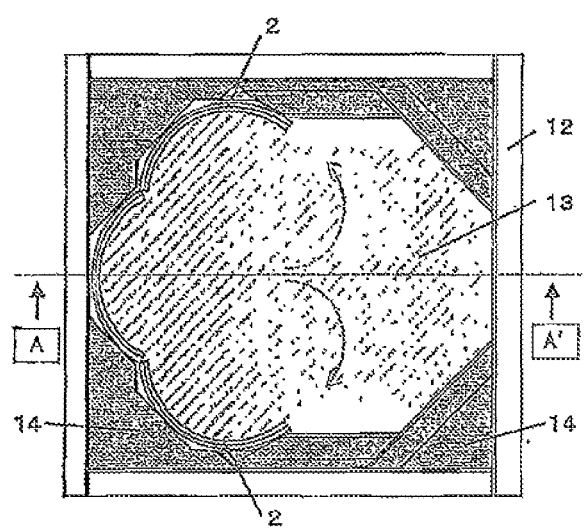
FIG. 7a is a schematic plan view showing a state in which when adjacent body components are allowed to swing open, the polyurethane resin composition is cast from the tank into the casting mold.
Figure 7B:
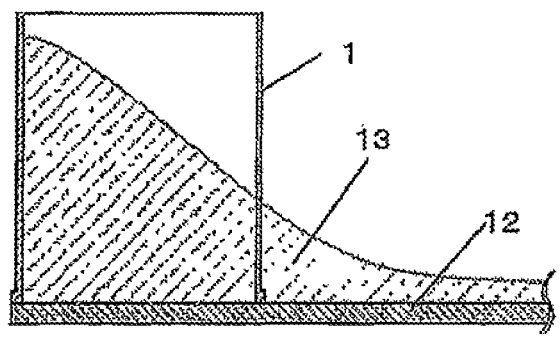

FIG. 7a is a schematic plan view showing a state in which when the adjacent body components are allowed to swing open, the polyurethane resin composition is cast from the tank into the casting mold. FIG. 7b is a schematic cross-sectional view along the line A-A' in FIG. 7a. When allowed to swing open, each body component 2 is preferably fixed at a certain position by means of the frame member 14.

Figure 8A:
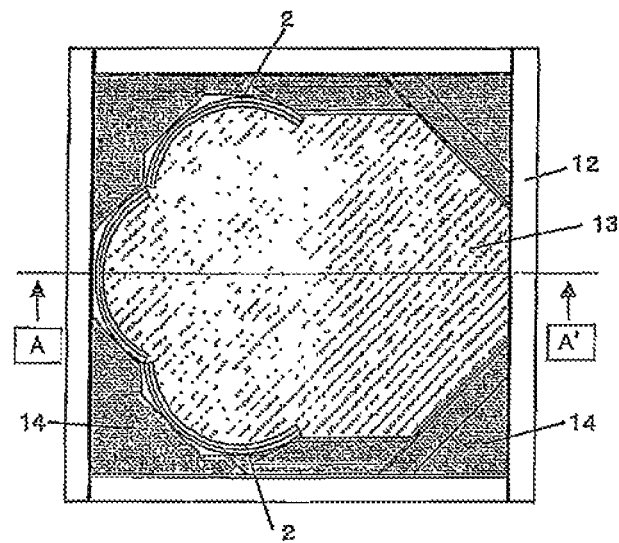
FIG. 8a is a schematic plan view showing a state after the polyurethane resin composition is cast from the tank into the casting mold.
Figure 8B:
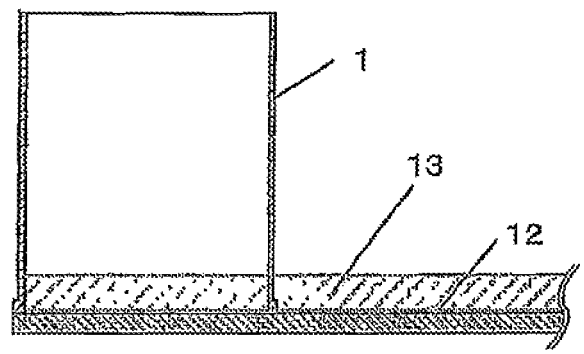

FIG. 8a is a schematic plan view showing a state obtained after the polyurethane resin composition is cast from the tank into the casting mold. FIG. 8b is a schematic cross-sectional view along the line A-A' in FIG. 8a.

Even if the polyurethane resin composition is highly viscous or highly thixotropic, this method makes it possible, with a simple operation, to cast the polyurethane resin composition from the tank into the casting mold without forming air voids. The raw material adhering to the inner wall of the tank also stays near the inner wall and is less likely to be cast. This is also advantageous in that such a raw material is less likely to enter the whole of the polyurethane resin composition in the casting mold.

Subsequently, the cast polyurethane resin composition is cured to form a polyurethane foam. The tank is preferably removed before the polyurethane resin composition is cured.

In the method of producing a polyurethane foam, the composition may be allowed to react until it does not flow, and the resulting foam may be heated and subjected to post curing. This process is advantageous because it is effective in improving the physical properties of the foam.

Subsequently, the polyurethane foam block is taken out of the casting mold and sliced into the desired thickness using a hand saw-type or planer-type slicer, so that a polishing layer (a monolayer-type polishing pad) is obtained. The thickness of the polyurethane foam block is generally, but not limited to, about 50 to about 100 mm. The thickness of the polishing layer is generally, but not limited to, about 0.8 to about 4 mm, preferably 1.0 to 2.5 mm.

The scatter of the thickness of the polishing layer is preferably 100 μm or less. When the scatter of the thickness is higher than 100 μm, large undulation is caused to generate portions different in a contacting state with an object of polishing, thus adversely influencing polishing characteristics.

To solve the scatter of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the scatter of thickness, there is also a method of buffing the surface of the polishing layer having a predetermined thickness. Buffing is conducted preferably stepwise by using polishing sheets different in grain size.

The average cell diameter of the polishing layer is preferably from 20 to 80 μm, more preferably from 30 to 60 μm.

An Asker D hardness of the polishing layer is preferably in the range of from 45 to 65 degrees, more preferably in the range of from 55 to 65 degrees.

The specific gravity of the polishing layer is preferably from 0.6 to 0.87, more preferably from 0.75 to 0.85.

A polishing surface of the polishing pad, which comes into contact with an object to be polished has preferably a asperity structure provided for retaining and refreshing a slurry. A polishing layer made of a foam has a number of openings in the polishing surface, and has a function of retaining and refreshing a slurry. By forming an asperity structure on the polishing surface, it is possible to conduct retention and refreshment of the slurry more efficiently, and to prevent the object to be polished from breaking due to adsorption of the material to be polished. The shape of the asperity structure is not particularly limited insofar as it is able to retain and refresh a slurry, and for example, XY grating groove, concentric ring groove, through-hole, non-through-hole, polygonal column, circular cylinder, spiral groove, eccentric ring groove, radial groove, and combination thereof can be recited. These asperity structures generally have regularity, however, groove pitch, groove width, groove depth and the like may be varied by a certain range for achieving desired retention and refreshment of slurry.

A polishing pad of the invention may also be a laminate of the polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion sheet is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion sheet include: for example, a method in which a double sided tape is sandwiched between the polishing layer and the cushion sheet, followed by pressing.

A polishing pad of the invention may be provided with a double sided tape on the surface of the pad adhered to a platen.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, with a polishing platen supporting a polishing pad (a polishing layer), a polishing head holding a semiconductor wafer, a backing material for applying a uniform pressure against the wafer and a supply mechanism of a polishing agent. The polishing pad is mounted on the polishing platen by adhering the pad to the platen with a double sided tape. The polishing platen and the polishing head are disposed so that the polishing pad and the semiconductor wafer supported or held by them oppositely face each other and provided with respective rotary shafts. A pressure mechanism for pressing the semiconductor wafer to the polishing pad is installed on the polishing head side. During polishing, the semiconductor wafer is polished by being pressed against the polishing pad while the polishing platen and the polishing head are rotated and a slurry is fed. No specific limitation is placed on a flow rate of the slurry, a polishing load, a polishing platen rotation number and a wafer rotation number, which are properly adjusted.

Protrusions on the surface of the semiconductor wafer are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]
(Measurement of Average Cell Diameter)

The prepared polyurethane foam was sliced with a microtome cutter into measurement samples each with the thinnest possible thickness of 1 mm or less. A surface of a sample was photographed with a scanning electron microscope (S-3500N, Hitachi Science Systems Co., Ltd.) at a magnification of ×100. An effective circular diameter of each of all cells in an arbitrary area was measured with an image analyzing soft (manufactured by MITANI Corp. with a trade name WIN-ROOF) and an average cell diameter was calculated from the measured values.

(Measurement of Specific Gravity)

Determined according to JIS Z8807-1976. A manufactured polyurethane foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Hardness)

Measurement is conducted according to JIS K6253-1997. A manufactured polyurethane foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

Example 1

To a reaction vessel were added 1,229 parts by weight of toluene diisocyanate (a mixture of 2,4-isomer/2,6-isomer=80/20), 272 parts by weight of 4,4'-dicyclohexylmethane diisocyanate, 1,901 parts by weight of polytetramethylene ether glycol with a number average molecular weight of 1,018, and 198 parts by weight of diethylene glycol, and allowed to react at 70° C. for 4 hours to from an isocyanate-terminated prepolymer.

The tank shown in FIG. 1 was placed in a casting mold as shown in FIG. 6. To the tank were added 100 parts by weight of the prepolymer and 3 parts by weight of a silicone surfactant (SH-192 manufactured by Dow Corning Toray Silicone Co., Ltd.), mixed, and degassed under reduced pressure with the temperature adjusted to 80° C. The mixture was then vigorously stirred with a stirring blade at a rotational speed of 900 rpm for about 4 minutes so that air bubbles were incorporated into the reaction system. To the resulting mixture was added 21 parts by weight of ETHACURE 300 (a mixture of 3,5-bis(methylthio)-2,6-toluenediamine and 3,5-bis(methylthio)-2,4-toluenediamine, manufactured by Albemarle Corporation), whose temperature had been previously adjusted to 70° C. The mixture was stirred for about 1 minute to form a polyurethane resin composition.

As shown in FIG. 7, the adjacent body components of the tank were then allowed to swing open, so that the polyurethane resin composition was cast from the tank into the casting mold. After the tank was removed, the casting mold was placed in an oven at a time when the polyurethane resin composition lost flowability. The composition was subjected to post curing at 100° C. for 16 hours so that a polyurethane foam block was obtained.

While heated at about 80° C., the polyurethane foam block was sliced using a slicer (VGW-125 manufactured by AMITEC Corporation), so that a polyurethane foam sheet was obtained (50 μm in average cell diameter, 0.86 in specific gravity, 52 degrees in hardness). Subsequently, the surface of the sheet was buffed using a buffing machine (manufactured by AMITEC Corporation) until its thickness reached 1.27 mm, so that a sheet with regulated thickness accuracy was obtained. The buffed sheet was stamped into a piece with a diameter of 61 cm. Concentric circular grooves with a width of 0.25 mm, a pitch of 1.50 mm, and a depth of 0.40 mm were formed on the surface of the piece using a grooving machine (manufactured by Techno Corporation), so that a polishing layer was obtained. Using a laminator, a double sided tape was bonded to the surface of the polishing layer opposite to its grooved surface. The surface of a corona-treated cushion sheet (Toraypef manufactured by Toray Industries, Inc., a polyethylene foam 0.8 mm in thickness) was also buffed and then bonded to the double sided tape using a laminator. A double sided tape was further bonded to the other surface of the cushion sheet using a laminator, so that a polishing pad was obtained.

INDUSTRIAL APPLICABILITY

The tank of the invention is used to contain a resin composition. The tank of the invention is particularly suitable for use in producing polishing pads from a resin composition having high viscosity or high thixotropy. The polishing pad of the invention is used for planarization of materials requiring a high degree of surface flatness, such as polishing of optical materials such as lenses and reflecting mirrors, silicon wafers, glass substrates for hard disks, aluminum substrates, and other general metal materials. The polishing pad of the invention is particularly suitable for use in a process of planarizing a silicon wafer, a device including a silicon wafer and an oxide layer, a metal layer, and other layers formed on the silicon wafer, or the material provided before such oxide and metal layers are formed and stacked.

DESCRIPTION OF REFERENCE SIGNS

1: Tank
2: Body component
3: Joint part
4: Opening and closing member
5: Joint member
6: Handle part
7: Seal member
8: Assisting member
9: Seal member
10: Frictional resistance reducing member
11: Locking member
12: Casting mold
13: Polyurethane resin composition
14: Frame member

The invention claimed is:

1. A tank for holding a resin composition, the tank comprising a tank wall made of two or more body components and joint parts, wherein:
   the two or more body components are separate components defined along the entire height of the tank and joined by the joint parts over the entire height of the tank to form a frame-shaped body,
   one of the joint parts includes an opening and closing member that joins adjacent ones of the body components in such a way that the adjacent body components can swing open, and
   each of all the other joint part(s) includes a joint member that joins adjacent ones of the body components in such a way that the adjacent body components can swing about the joint member,
   said tank being bottomless.

2. The tank according to claim 1, which is cylindrical tube-shaped, wherein the number of the body components is three.

3. A method for producing a polishing pad, the method comprising a process of making a polishing layer made of polyurethane resin, the process including the steps:
   (A) holding a polyurethane resin composition in a tank placed in a casting mold, said tank comprising a tank wall made of two or more body components and joint parts, wherein the two or more body components are separate components defined along the entire height of the tank and joined by the joint parts over the entire height of the tank to form a frame-shaped body; one of the joint parts includes an opening and closing member that joins adjacent ones of the body components in such a way that the adjacent body components can swing open; and each of all the other joint part(s) includes a joint member that joins adjacent ones of the body components in such a way that the adjacent body components can swing about the joint member;
   (B) opening the opening and closing member on the tank to allow adjacent ones of the body components to swing open, so that the polyurethane resin composition is cast from the tank into the casting mold; and (C) curing the cast polyurethane resin composition to form a polyurethane resin.

4. The method according to claim 3, wherein the step (A) includes stirring a first component in the tank in the presence of a nonreactive gas, wherein the first component contains an isocyanate group-containing compound and a silicone surfactant, so that the nonreactive gas is dispersed as fine bubbles to form a bubble dispersion liquid; and mixing a second component with the formed bubble dispersion liquid to form the polyurethane resin composition to be held in the tank, wherein the second component contains an active hydrogen group-containing compound.

5. The tank according to claim 1, wherein when the adjacent body components swing open, at least ½ of the tank wall as viewed from above is swingable.

* * * * *